(12) United States Patent
Monger

(10) Patent No.: US 12,475,538 B2
(45) Date of Patent: Nov. 18, 2025

(54) HYBRID STOCHASTIC LAYERED ALPHA BLENDING

(71) Applicant: Adobe Inc., San Jose, CA (US)

(72) Inventor: Michael Seth Monger, Burien, WA (US)

(73) Assignee: Adobe Inc., San Jose, CA (US)

(*) Notice: Subject to any disclaimer, the term of this patent is extended or adjusted under 35 U.S.C. 154(b) by 236 days.

(21) Appl. No.: 18/486,962

(22) Filed: Oct. 13, 2023

(65) Prior Publication Data

US 2025/0124548 A1 Apr. 17, 2025

(51) Int. Cl.
| | | |
|---|---|---|
| *G06T 15/20* | (2011.01) | |
| *G06T 5/50* | (2006.01) | |
| *G06T 7/50* | (2017.01) | |
| *G06T 7/90* | (2017.01) | |
| *G06V 10/56* | (2022.01) | |

(52) U.S. Cl.
CPC .......... *G06T 5/50* (2013.01); *G06T 7/50* (2017.01); *G06T 7/90* (2017.01); *G06V 10/56* (2022.01); *G06T 2207/10024* (2013.01); *G06T 2207/20221* (2013.01)

(58) Field of Classification Search
CPC .... G06T 5/50; G06T 7/50; G06T 7/90; G06T 2207/20221; G06V 10/56
See application file for complete search history.

(56) References Cited

U.S. PATENT DOCUMENTS

| | | | | |
|---|---|---|---|---|
| 7,042,462 B2* | 5/2006 | Kim | ................. | G06T 15/405 |
| | | | | 345/545 |
| 7,471,291 B2* | 12/2008 | Kaufman | ................. | G06T 15/08 |
| | | | | 345/424 |
| 7,574,070 B2* | 8/2009 | Tanimura | ................. | G06V 40/10 |
| | | | | 382/284 |

(Continued)

FOREIGN PATENT DOCUMENTS

CN 116402936 A * 7/2023 ............. G06T 15/20

OTHER PUBLICATIONS

Chris Wyman, Stochastic Layered Alpha Blending, 2016, SIGGRAPH, pp. 1-2. (Year: 2016).*

(Continued)

*Primary Examiner* — Cheng Yuan Tseng
(74) *Attorney, Agent, or Firm* — Nicholson De Vos Webster & Elliott LLP

(57) ABSTRACT

Embodiments are disclosed for generating a rendering output using a hybrid stochastic layered alpha blending technique. In particular, in one or more embodiments, the method may include receiving a plurality of fragments for rendering into a composited output. The method may further include storing a set of fragments of the plurality of fragments for each pixel in a fragment buffer up to a per pixel fragment buffer limit. For each received fragment of the plurality of fragments in excess of the fragment buffer limit for the fragment buffer, a modified set of fragments is generated by probabilistically replacing a selected fragment in the fragment buffer with the received fragment. The (Continued)

resulting fragments in the fragment buffer after processing the plurality of fragments is a blending set of fragments. A composited output for the pixel is then rendered by blending the blending set of fragments.

20 Claims, 8 Drawing Sheets

(56) References Cited

U.S. PATENT DOCUMENTS

| | | | | |
|---|---|---|---|---|
| 7,812,837 | B2* | 10/2010 | Naoi | G06T 15/405 |
| | | | | 345/422 |
| 8,264,546 | B2* | 9/2012 | Witt | H04N 5/2224 |
| | | | | 348/222.1 |
| 8,484,280 | B2* | 7/2013 | Uto | G06F 9/54 |
| | | | | 709/202 |
| 8,754,897 | B2* | 6/2014 | Bakalash | G06T 15/005 |
| | | | | 345/519 |
| 8,798,373 | B2* | 8/2014 | Shibata | H04N 1/4097 |
| | | | | 382/282 |
| 8,861,846 | B2* | 10/2014 | Takeuchi | H04N 5/265 |
| | | | | 382/165 |
| 9,001,124 | B2* | 4/2015 | Engel | G06T 15/08 |
| | | | | 345/426 |
| 9,111,172 | B2* | 8/2015 | Noda | G06V 10/7515 |
| 9,218,686 | B2* | 12/2015 | Kazakov | G06T 15/005 |
| 10,042,188 | B2* | 8/2018 | Choukroun | G06T 7/60 |
| 10,249,016 | B2* | 4/2019 | Broadhurst | G09G 5/363 |
| 10,350,495 | B2* | 7/2019 | Tamaoki | A63F 13/53 |
| 10,387,990 | B2* | 8/2019 | Broadhurst | G09G 5/363 |
| 10,417,813 | B2* | 9/2019 | Wyman | G06T 15/40 |
| 10,614,619 | B2* | 4/2020 | Mendez | G06T 15/503 |
| 10,867,582 | B2* | 12/2020 | Davidson | G06F 3/147 |
| 11,167,215 | B2* | 11/2021 | Nakano | A63F 13/795 |
| 11,179,641 | B2* | 11/2021 | Nakano | A63F 13/798 |
| 11,861,760 | B2* | 1/2024 | Brkic | G06T 1/60 |
| 12,118,657 | B2* | 10/2024 | Engel | G06T 15/08 |
| 2003/0059114 | A1* | 3/2003 | Naoi | G06T 15/005 |
| | | | | 382/181 |
| 2010/0134688 | A1* | 6/2010 | Moriwake | G06T 15/506 |
| | | | | 345/426 |
| 2013/0114888 | A1* | 5/2013 | Saito | G06T 5/73 |
| | | | | 382/159 |
| 2025/0124548 | A1* | 4/2025 | Monger | G06T 1/20 |

OTHER PUBLICATIONS

Marco Salvi, Multi-Layer Alpha Blending, 2014, ACM, pp. 151-157. (Year: 2014).*

Chris Wyman, Exploring and Expanding the Continuum of OIT Algorithms, 2016, High Performance Graphics, pp. 1-11. (Year: 2016).*

Chris Wyman, Exploring and Expanding the Continuum of OIT Algorithms, 2016, Nvidia, pp. 1-80. (Year: 2016).*

Bavoil, L., et al., "Multi-Fragment Effects on the GPU using the k-Buffer," I3D '07: Proceedings of the 2007 Symposium on Interactive 3D graphics and games, Apr. 2007, pp. 97-104.

Wyman, C., "Stochastic Layered Alpha Blending," ACM SIGGRAPH 2016 Talks (SIGGRAPH '16), Article 37, Jul. 2016, pp. 1-2.

* cited by examiner

HYBRID STOCHASTIC LAYERED ALPHA BLENDING

BACKGROUND

An important aspect in rendering computer graphics can be accurately compositing objects and elements, including their transparencies, using fragment data. Compositing involves rendering multiple pieces of a frame separately and merging the renders to produce a final output. In compositing, each pixel of a digital representation (e.g., an image, a video sequence, 3D animation, etc.) can be defined by one or more fragments. Each fragment includes information used for rendering an accurate representation of the pixel, including depth data, position, color data, opacity, etc. Order-independent transparency is a rasterization technique for rendering transparency in a digital representation (e.g., 3D animation) that merges the data from the fragments associated with a pixel to produce an output for the pixel (e.g., color data).

SUMMARY

Introduced here are techniques/technologies that allow a digital design system to perform a hybrid stochastic layered alpha blending (SLAB) rendering technique where an accurate k-buffer alpha composite is preferred to generate a single pass composite with minimal noise from a blending set of initially received fragments up to a fixed fragment buffer size limit per pixel. If there are more fragments than can fit in the fragment buffer, during blending set selection, the process for fragment selection for that single pass then shifts to the SLAB technique in an unbiased configuration, which includes stochastically discarding fragments from the buffer memory and replacing the discarded fragments with unprocessed fragments to generate an incomplete but reduced-noise representative blending set.

In particular, in one or more embodiments, a renderer in a digital design system generates and then composites a plurality of fragments into a composited output. Inputs to the renderer can be various sources of geometry and textures, such as 3D meshes, video sequences, animated sequences, images, where each output pixel of the composited output may result from a plurality of fragments, including semi-opaque overlapping fragments. The renderer in the digital design system generates the plurality of fragments for the provided inputs. A blending set selector can receive the plurality of fragments as a stream and, for each pixel, place the fragments in a fragment buffer up to a fixed size, or fragment buffer limit per pixel. Thus, all of the fragments can fit in the fragment buffer when the number of fragments does not exceed the fragment buffer limit. However, if the stream of fragments for a pixel exceeds the fixed size limit of the fragment buffer, the fragment buffer cannot hold all of the fragments for that pixel. In this situation, the digital design system begins stochastically replacing fragments already in the fragment buffer with the newly received fragments using the SLAB technique. When the fragments do not exceed the fragment buffer limit, the digital design system can generate the output pixel by blending the fragment data (e.g., depth data, opacity data, color data, etc.) for the blending set for the pixel in a noise-free single pass. As a result, the blending set for any single output pixel can either be all K fragments (e.g., fragments that would be processed using a precise K-buffer blending technique), may be all S fragments (e.g., fragments stochastically replaced using the SLAB technique in an unbiased configuration), or a mixture of K fragments and S fragments. For example, the blending set is all K fragments when the number of fragments do not exceed the fragment buffer limit, all S fragments frames when the number of fragments is much larger than the fragment buffer limit, and a mixture of K fragments and S fragments when the number of fragments exceeds the fragment buffer limit by a smaller amount. The digital design system then renders a composited output by blending the fragment data for the fragments in the possibly-mixed blending set, adjusting the alpha composite based on the fragment types present in the blend set. By mixing techniques, a single blend pass can produce composited output frames in fixed GPU memory without noise for low transparency cases, and relatively low noise output frames in high transparency cases. In some situations, to render a higher quality output, the digital design system can additionally composite a plurality of rendered frames generated through multiple passes of through the renderer to converge out remaining SLAB noise, which in moderate or mixed transparency cases can be already reduced vs SLAB alone due to the presence of accurate K fragments.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
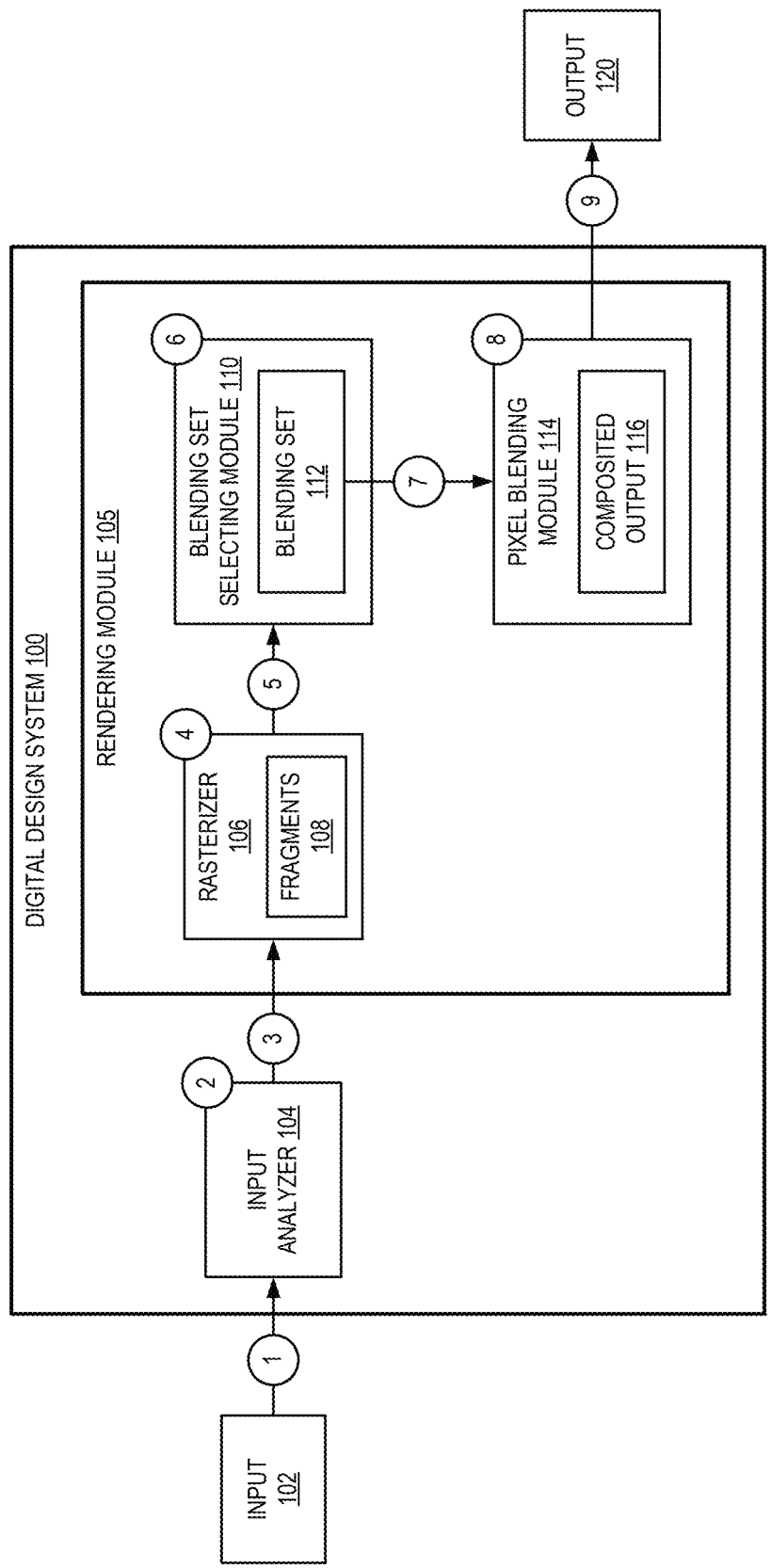
FIG. 1 illustrates a diagram of a process of generating a rendering output using a hybrid stochastic layered alpha blending technique in accordance with one or more embodiments.

One or more embodiments of the present disclosure include a digital design system that generates a digital render through a hybrid stochastic layered alpha blending (SLAB) rendering technique. The hybrid SLAB rendering technique produces an accurate compositing of fragments when the number of fragments does not exceed a fragment buffer limit per pixel. When the number of fragments exceeds the fragment buffer limit for a particular pixel, the hybrid SLAB rendering technique stochastically replaces fragments in the fragment buffer with newly-received fragments.

Existing transparency rendering techniques include those directed to game engines and others directed to film engines. Game engines are tuned for real-time, typically do not deal with deep transparency cases, and often give up realism for the sake of speed. In contrast, film engines that are focused on realism, use ray tracing techniques, and are relatively slow without specialized hardware. Compositing does not fit well with either technique because compositing can require deep transparency and high quality frames (unlike game engine techniques) and can involve rendering potentially many elements separately where effects can be applied to each render, making fast low noise renders generally more important than strict realism (unlike film engines techniques).

Some conventional solutions attempt to address the limitations of a limited fragment buffer. For example, in some conventional solutions, when the number of fragments exceeds the size of a fragment buffer, fragments are blended together until all the layers can fit within the fragment buffer. However, blending fragments in this manner results in the loss of, or inaccuracies in, the per fragment depth, opacity, and color data for the blended fragments. In other conventional solutions, the system selects some of the fragments for rendering a composite, while masking or discarding others. However, this often results in a noisy output in the frontmost layers when there is low transparency. In other techniques, some fragments in the fragment buffer can be discarded even before the fragment buffer reaches capacity, also resulting in increased noise. Other solutions require multiple renders to achieve usable frames, which can be resource and time-intensive.

To address these and other deficiencies in conventional systems, the digital design system of the present disclosure uses a hybrid SLAB technique for composites that produces a low noise, single pass, high-speed render by performing a K-buffer style blending of fragments when the number of fragments does not exceed the per pixel fragment buffer limit. The hybrid SLAB technique then gradually shifts to an unbiased stochastic SLAB as the fragment count rises above the per pixel fragment buffer limit. The SLAB technique stochastically replaces fragments by applying SLAB stratified masking, allowing coverage interaction between fragments to minimize single pass noise over stochastic behavior alone. During the mixed state (e.g., above the buffer limit), noise can be minimized as exact k fragments remain in the blending set until stochastically lost, which can mitigate the inaccuracy issues introduced by conventional systems that combine or approximate fragments. The digital design system can produce noise free renders for low to medium transparency scenes in a single render pass, thereby conserving computing resources and time. Further, rapid convergence to high quality renders with minimized noise in deep transparency cases (e.g., 2× or more the buffer depth) can be achieved by optionally performing additional passes. Further, the hybrid SLAB technique can be implemented on fixed GPU memory without requiring specialized GPU extensions.

FIG. 1 illustrates a diagram of a process of generating a rendering output using a hybrid stochastic layered alpha blending technique in accordance with one or more embodiments. The rendering output can be a video sequence or animated sequence, a frame, an image, or other similar digital rendering. As illustrated in FIG. 1, a digital design system 100 can include an input analyzer 104 and a rendering module 105. The rendering module 105 can include a rasterizer 106, a blending set selecting module 110 and a pixel blending module 114. As shown in FIG. 1, a digital design system 100 receives an input 102, as shown at numeral 1. For example, the digital design system 100 receives the input 102 from a user via a computing device or from a memory or storage location. In one or more embodiments, the input 102 is a rendering input that includes a model or data for rendering (e.g., meshes, geometry, textures, etc.) to be used to generate a rendered output. In one or more embodiments, the input 102 can be provided in a graphical user interface (GUI).

As illustrated in FIG. 1, the input analyzer 104 receives the input 102. In some embodiments, the input analyzer 104 analyzes the input 102, at numeral 2. In some embodiments, the input analyzer 104 analyzes the input 102 to identify the rendering input. The input analyzer 104 then passes the rendering input to a rasterizer 106 of the rendering module 105, as shown at numeral 3. The rendering module 105 includes modules that generate a rendering output using data from the rendering input using a hybrid stochastic layered alpha blending (SLAB) process. In the hybrid SLAB process, fragments are placed into a fragment buffer (e.g., blending set selecting module 110) until the fragment buffer is full per pixel, and then if additional fragments are received, fragments in the fragment are stochastically replaced with newly received fragments.

In one or more embodiments, the rasterizer 106 is configured to generate fragments 108 from the rendering input, at numeral 4. For example, the rasterizer 106 receives the rendering input that includes the data for rendering (e.g., meshes, geometry, textures, etc.) and breaks the rendering input into the fragments 108. In one or more embodiments, the fragments 108 define data for pixels and can include depth data, opacity data, color data, fragment type data, etc. Each pixel can be rendered from a plurality of fragments to generate an output render for the pixel. Different pixels can be rendered from a different number of fragments. In one or more embodiments, the output render for each pixel is generated by compositing the fragments 108 associated with the pixel, including semi-opaque overlapping fragments. For example, the depth data, opacity data, and color data for each of the fragments 108 is used in the compositing to determine the output color for the pixel.

As the rasterizer 106 generates the fragments 108, the fragments 108 are sent to a blending set selecting module 110, as shown at numeral 5. In one or more embodiments, the fragments 108 are sent to the blending set selecting module 110 as a stream of fragments. The blending set selecting module 110 processes the fragments using a hybrid stochastic layered alpha blending (SLAB) process, at numeral 6. In one or more embodiments, the blending set selecting module 110 begins placing the fragments 108 in a fragment buffer. For each pixel, all of the fragments 108 received from the rasterizer 106 can be placed in the fragment buffer up to the size of the fragment buffer (e.g., a fragment buffer limit per pixel). For example, where the size of the fragment buffer is eight (e.g., it can hold up to eight fragments per pixel), the fragment buffer can hold up to eight fragments from the fragments 108 before the fragment buffer limit is reached. The size of the fragment buffer can be defined and/or limited by the amount of memory designated by the digital design system 100 for holding fragments.

When a pixel is associated with a greater number of fragments than the size of the fragment buffer, the blending set selecting module 110 utilizes the SLAB process to determine how to modify the fragment buffer. Using the SLAB process, the blending set selecting module 110 begins replacing fragments in the fragment buffer with newly received fragments received from the rasterizer 106. In one or more embodiments, for each additional fragment beyond the fragment buffer limit, the blending set selecting module 110 can select one fragment from the fragment buffer for removal from the fragment buffer. In one or more embodiments, the fragment selected for removal is overwritten with the new fragment. In one or more embodiments, the fragment selected for removal can be determined based on the transparencies and coverage of the fragments in the fragment buffer. Additional details of this process are described in FIG. 3.

In some embodiments, when a fragment is ejected from the fragment buffer and replaced with an incoming fragment, the fragment can be marked or otherwise indicated as being a stochastic or S fragment. For example, a bit can be set to indicate whether the fragment is a K fragment or an S fragment.

When there are no additional fragments 108 from the rasterizer 106, the fragments 108 in the fragment buffer is the blending set 112 that will be used to generate the composited output 116. For each individual pixel, the blending set 112 can be all K fragments (e.g., fragments received when the number of fragments is less than the fragment buffer limit), all S fragments (e.g., where all the fragments have been placed into the blending set 112 as replacement for other fragments), or a mixture of K and S fragments as marked/flagged during replacement. The blending set 112 is then passed to a pixel blending module 114, as shown at numeral 7. In one or more embodiments, prior to sending the blending set 112 to the pixel blending module 114, the fragments in the blending set 112 are sorted, or arranged, by depth. In other embodiments, the sorting of the fragments can be performed by the pixel blending module 114. As alpha blending is order dependent, the sorting is performed to ensure that the pixel compositing performed by the pixel blending module 114 results in an accurate blend and to minimize single pass noise. In other embodiments, the fragments in the blending set 112 are not sorted prior to the blending of the blending set of fragments in the blending set 112. Using the blending set 112, the pixel blending module 114 generates a composited output 116, at numeral 8. The pixel blending module 114 blends the fragments in the blending set 112 to generate an output pixel. The pixel blending module 114 uses the data associated with each fragment in the blending set 112, including the depth data, opacity data, color data, fragment type data, etc. to generate the composited output 116 for the pixel. For example, the composited output 116 can include an output color generated from processing all the data (e.g., depth data, opacity data, color data, fragment type data, etc.) associated with each fragment in the blending set 112. The composited output for each pixel can then be combined to generate a high-speed, relatively low-noise frame rendered from the rendering input in a single rendering pass.

In one or more embodiments, the K fragments and S fragments in the blending set 112 are treated differently, based on how the blending set selecting module 110 determines whether to eject a K fragment (e.g., fragments that would be processed using a high quality K-buffer blending technique) in favor of an S fragment (e.g., a fragment stochastically inserted in place of a K fragment). For example, for a single render pass, K fragments are blended using the precise original alpha values, but S fragments are blended using the SLAB quantized mask alpha values. The SLAB quantized mask values may be higher or lower than related precise K alpha blending values would be if there was enough space.

When the blending set selecting module 110 ejects a K fragment in favor of an S fragment, during blending, the missing K fragment is now, in effect, becoming an S fragment by side effect. However, since an ejected K fragment is not in the current blending set, the other blending sets that include the K fragment may need to know that the K fragment should be treated as an S fragment during blending. However, such communications would be resource and time intensive. Instead, a pixel local heuristic is applied to control the balance of the transition from majority K fragments to majority S fragments. There are different heuristics that can be tuned for different purposes. For example, more S fragments can increase the number of fragments in the back of the blend being treated as S fragments even if they are marked K fragments, since such fragments are most likely to have been ejected in other pixel blend sets. Under this example heuristic, frontmost K fragments unlikely to get S ejected remain precise K blend until S levels become very high. At this point everything in the pixel is treated as unbiased stochastic SLAB. Such extreme cases may be rare and may appear only transiently in portions of a frame since this is process is performed per pixel.

In one or more embodiments, when a pixel is associated with fewer fragments than the size of the fragment buffer (e.g., all of the fragments associated with the pixel can fit in the fragment buffer), the pixel blending module 114 can generate a composited output 116 using the data associated with all of the fragments associated with the pixel. In such situations, as all fragments were included in the blending set 112, the SLAB process is not triggered.

After the pixel blending module 114 generates a composited output 116 for each pixel, the result is frame that can be sent as an output 120, as shown at numeral 9. In one or more embodiments, after the process described above in numerals 1-8, the output 120 can be displayed in the digital design system 100, sent through a communications channel to another computing device associated with the user or another user, or to another system or application. In one or more embodiments, the output 120 can be optionally blended using temporal anti-aliasing.

Figure 2:
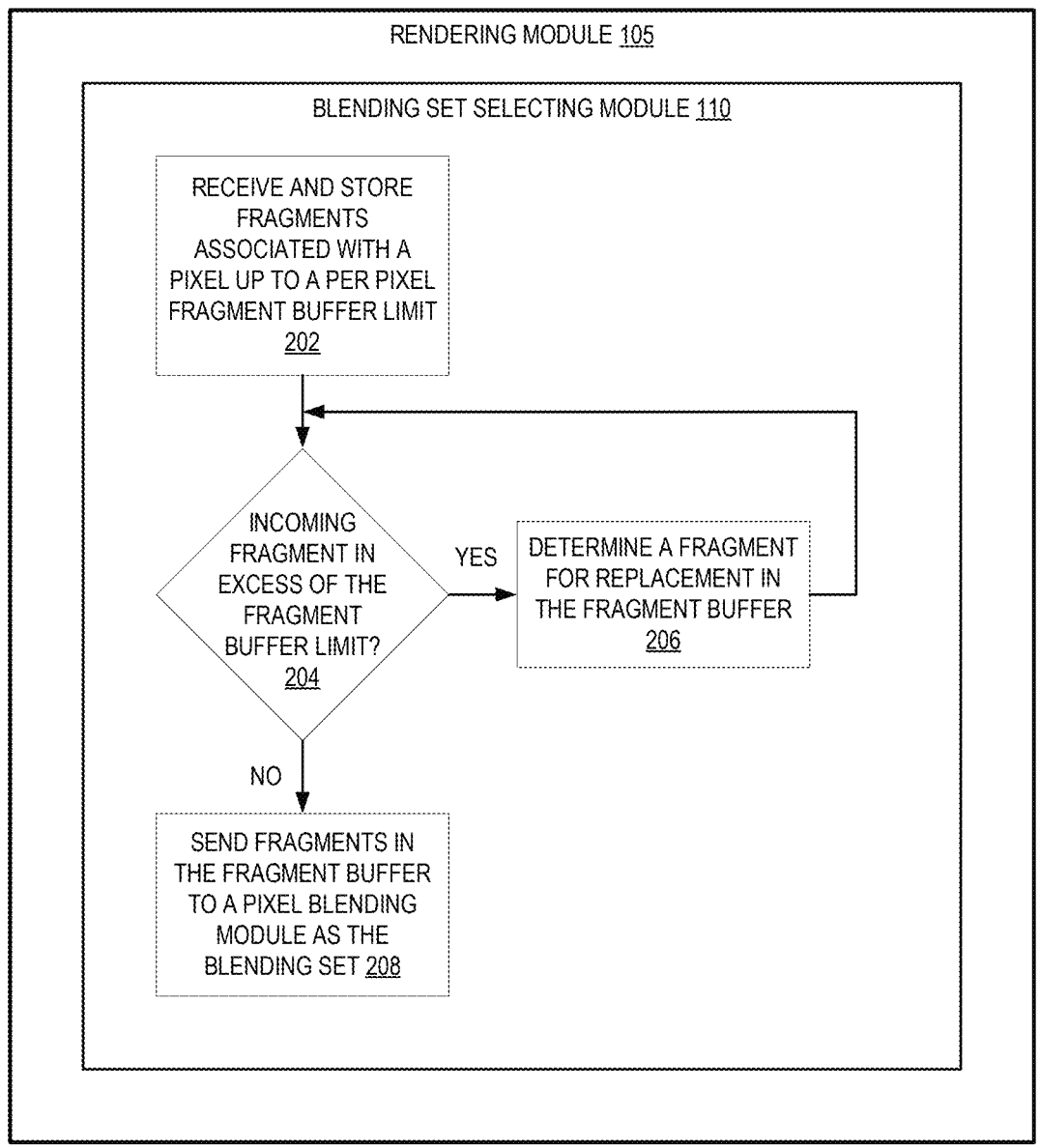
FIG. 2 illustrates a flowchart depicting the logic performed by a rendering module using a hybrid stochastic layered alpha blending technique in accordance with one or more embodiments.

FIG. 2 illustrates a flowchart depicting the logic performed by a rendering module using a hybrid stochastic layered alpha blending technique in accordance with one or more embodiments. At step 202, the blending set selecting module 110 receives and stores fragments associated with a pixel up to a per pixel fragment buffer limit. In one or more embodiment, each pixel can be associated with one or more fragments that are used to render an output. Each fragment can include data used to generate an output color for the pixel, including depth data, opacity data, color data, and fragment type data. As the fragments are received (e.g., in a stream from a rasterizer), they are placed into the fragment buffer by the blending set selecting module 110, which has a fixed size, or fragment buffer limit, per pixel.

At step 204, with the fragment buffer full, the blending set selecting module 110 determines whether there is an incoming fragment for the pixel in excess of the fragment buffer limit. When the number of fragments for the pixel exceeds the fragment buffer limit, the operations proceed to step 206. When there is not an additional incoming fragments for the pixel, the operations proceed to step 208.

At step 206, as there is an incoming fragment the exceeds the fragment buffer limit, the blending set selecting module 110 determines a fragment for replacement in the fragment buffer. The blending set selecting module 110 determines which fragment currently in the fragment buffer, if any, to replace with the incoming fragment. In one or more embodiments, the blending set selecting module 110 selects at least one fragment from the fragment buffer for removal using a stochastic layered alpha blending (SLAB) technique. In one or more embodiments, the fragment selected for removal can be determined based on the transparencies and depths of the fragments in the fragment buffer. For example, an existing fragment of high transparency and depth would be prioritized for removal from the fragment buffer and replaced with a new fragment. In one or more embodiments, the fragment selected for replacement in the fragment buffer is probabilistically selected in an unbiased SLAB configuration. Conversely, the more opaque and frontmost a fragment is, the more likely it will remain in the fragment buffer. In one or more embodiments, if most fragments are determined to be higher probability, the farthest or deepest fragment may be replaced. In some scenarios, the incoming fragment itself may also be entirely skipped (e.g., if a probabilistic SLAB coverage mask indicates that the fragment is covered by another fragment in the pixel's current blending set). The process then returns to step 204 to check if there is another incoming fragment in excess of the fragment buffer limit (e.g., in the stream from the rasterizer). When there is an additional incoming fragment, the operations proceed back to step 206 to repeat the SLAB process. When there is not an additional incoming fragment, the operations proceed to step 208.

At step 208, the blending set selecting module 110 sends the fragments in the fragment buffer to a pixel blending module (e.g., pixel blending module 114) as the blending set of fragments for the pixel to render a composited output for the pixel. If the number of fragments for the pixel did not exceed the fragment buffer limit (e.g., the SLAB process was not triggered), all of the fragments associated the pixel fit in the fragment buffer and are included in the blending set. If the number of fragments for the pixel exceeded the fragment buffer limit (e.g., the SLAB process was triggered), the blending set can include at least some fragments that were stochastically placed in the fragment buffer.

In one or more embodiments, prior to the blending of the blending set of fragments by the pixel blending module, the fragments can be sorted, or arranged, by depth. The can ensure that the pixel blending performed by the pixel blending module is accurate, as alpha blending is order dependent. In other embodiments, the fragments in the blending set 112 are not sorted prior to the blending of the blending set of fragments in the blending set 112. The pixel blending module can use the data associated with each fragment in the blending set of fragment, including the depth data, opacity data, color data, fragment type data, etc. to generate the composited output.

Figure 3:
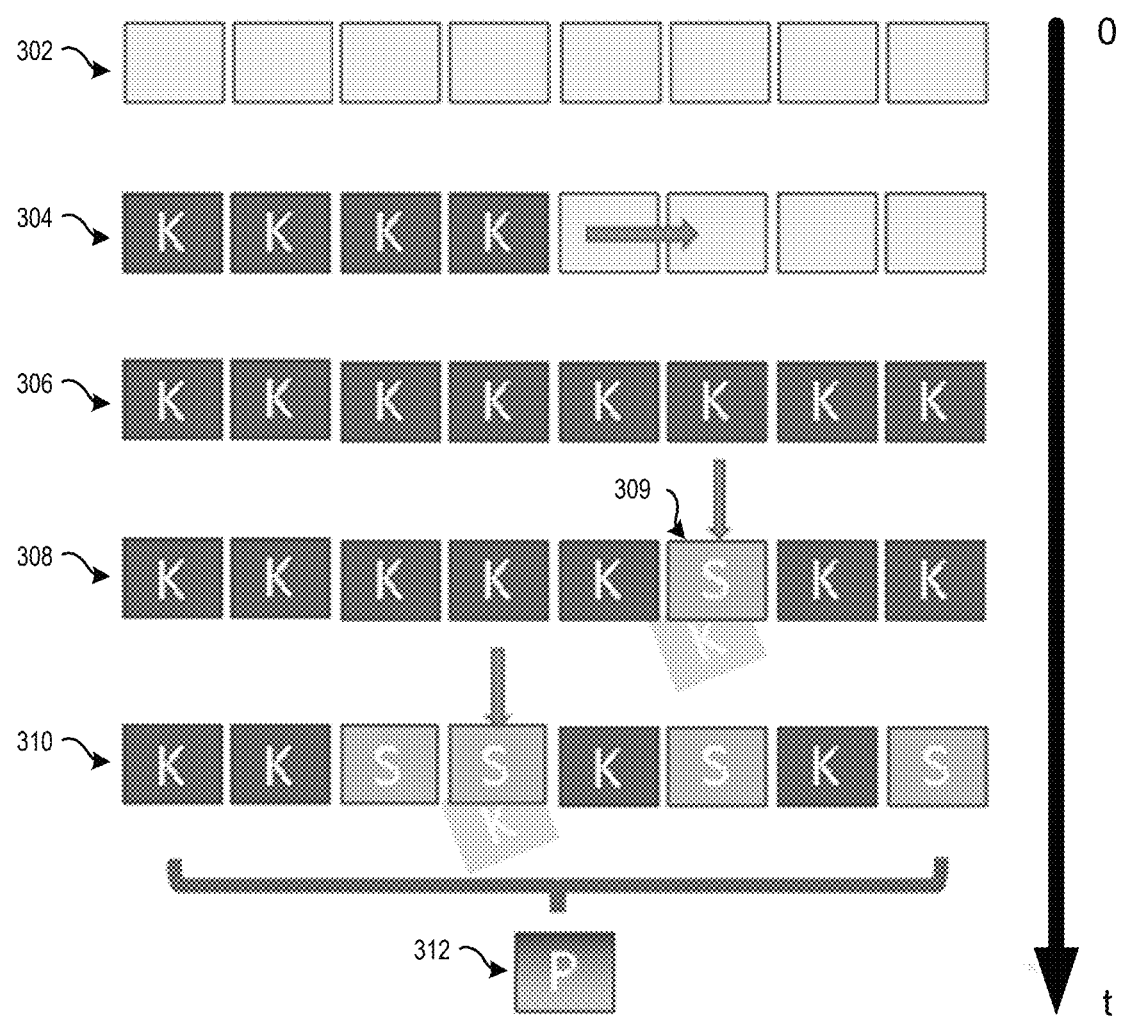
FIG. 3 illustrates an example process of performing a hybrid stochastic alpha layer blending in accordance with one or more embodiments.

FIG. 3 illustrates an example process of performing a hybrid stochastic alpha layer blending in accordance with one or more embodiments. FIG. 3 depicts a representation of a fragment buffer of a rendering module (e.g., rendering module 105) as fragments are received over a period of time (e.g., from time 0 to time t). In the example of FIG. 3, the fragment buffer has eight positions or slots in a memory location (e.g., the fragment buffer limit) and represents the blending set of one pixel of a plurality of pixels in the desired output frame, image, etc., that will be used to generate a composited output after all fragments have been processed. In one or more other embodiments, the fragment buffer limit per pixel can be larger or smaller than the fragment buffer depicted in FIG. 3. At stage 302, the fragment buffer is initially empty prior to the rendering module receiving fragments as input (e.g., in a stream of fragments from a rasterizer). While the fragment buffer has slots for additional fragments (e.g., the fragment buffer limit has not been reached), the fragments up to the fragment buffer limit are denoted by "K," to indicate they will be blended k-buffer style unless decided otherwise. At stage 304, the blending set selecting module (e.g., blending set selecting module 110) begins receiving fragments and begins filling the open slots of the fragment buffer. For example, stage 304 depicts the placement of four fragments into the slots of the fragment buffer. Although the fragments are shown as being placed into the fragment buffer in an order, in some embodiments, they can be placed into the fragment buffer in an unordered manner. At stage 306, the blending set selecting module receives an amount of fragments that fills the fragment buffer (e.g., eight "K" fragments). If there were no additional fragments at this point, the blending set would be all eight fragments received and any composited output generated by the rendering module would be noise-free, as the rendering module can process up to eight fragments without losing or omitting fragment data. However, at stage 308, the blending set selecting module receives an additional fragment for placement in the fragment buffer. As the fragment buffer has reached capacity, one of the fragments currently in the fragment buffer can be stochastically replaced with the additional fragment. For example, at stage 308, the "K" fragment in slot 309 can be stochastically replaced with the additional fragment using stochastic layered alpha blending (SLAB), represented by "S," to indicate that the blend will used quantized SLAB alpha. In one or more embodiments, using the SLAB method, the fragment selected for removal can be determined based on the transparencies and depths of the fragments in the fragment buffer. For example, a fragment can be selected for replacement based on its probability of being obscured by another fragment based on overlapping transparencies and depths of the fragments in the fragment buffer. As such, the fragments with most transparency will tend to be removed more often. At stage 310, as more fragments are received by the rendering module, additional fragments are stochastically replaced. Thus, "K" fragments are replaced by "S" fragments as incoming fragments continue to exceed the fragment buffer limit for a pixel. In one or more embodiment, the fragment can be marked (e.g., by setting a bit) to indicate that it was stochastic replaced. At stage 312, the composited output can then be generated by blending the fragments in the fragment buffer to generate a final output (e.g., a final output color) for a pixel. For example, the composited output can include an output color generated from processing all the data (e.g., depth data, opacity data, color data, fragment type data, etc.) associated with each fragment in the fragment buffer. For example, the pixel, P, at stage 312 represents a pixel with a final output color from the blending of the fragments shown in stage 310.

Figure 4:
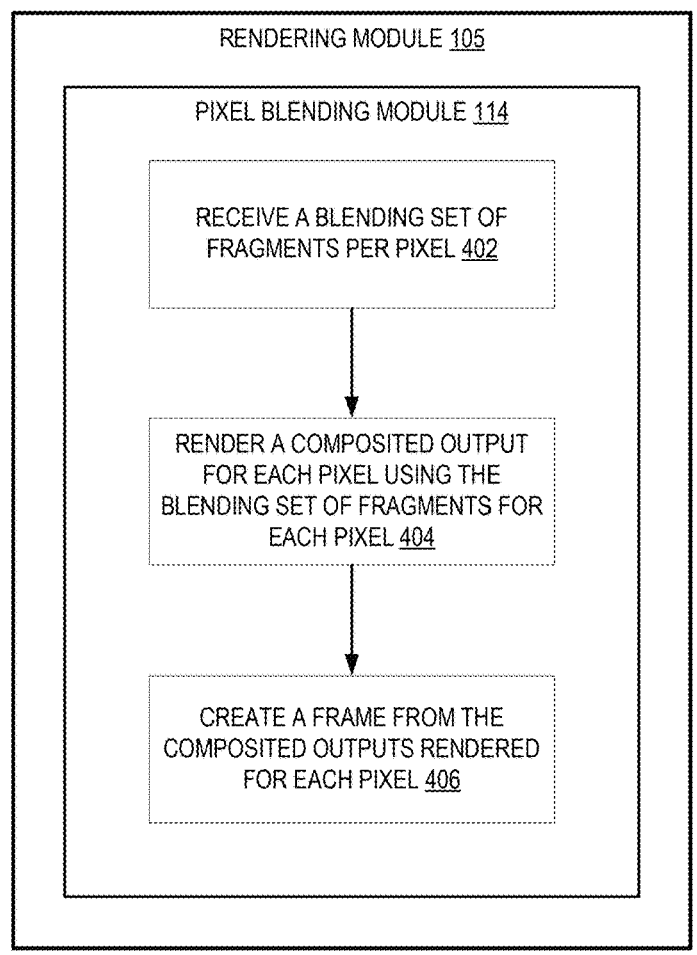
FIG. 4 illustrates a flowchart depicting the logic performed by a rendering module to generate an output frame from composited outputs in accordance with one or more embodiments.

FIG. 4 illustrates a flowchart depicting the logic performed by a rendering module to generate an output frame from composited outputs in accordance with one or more embodiments. At step 402, pixel blending module 114 receives a blending set of fragments per pixel. In one or more embodiments, the blending set of fragments are the fragments stored in a fragment buffer after processing a plurality of fragments for a given pixel using a hybrid stochastic layered alpha blending (SLAB) process, as described previously with respect to FIGS. 2-3.

At step 404, the pixel blending module 114 renders a composited output for each pixel using the blending set of fragments for each pixel. The pixel blending module 114 uses the data associated with each fragment in the blending set of fragment, including the depth data, opacity data, color data, fragment type data, etc. to generate the composited output. For example, the composited output for each pixel can include an output color generated from processing all the data (e.g., depth data, opacity data, color data, fragment type data, etc.) associated with each fragment in the blending set of fragments for the corresponding pixel. In one or more embodiments, the pixel blending module 114 can store the composited output in a storage or memory location.

At step 406, the pixel blending module 114 creates a frame from the composited outputs rendered for each pixel. The pixel blending module 114 renders a composited output for each pixel using the fragments in the fragment buffer corresponding to each pixel. After generating a plurality of composited outputs (e.g., one for each pixel), the plurality of composited outputs can be combined to generate a high-quality, low-noise output frame.

Figure 5:
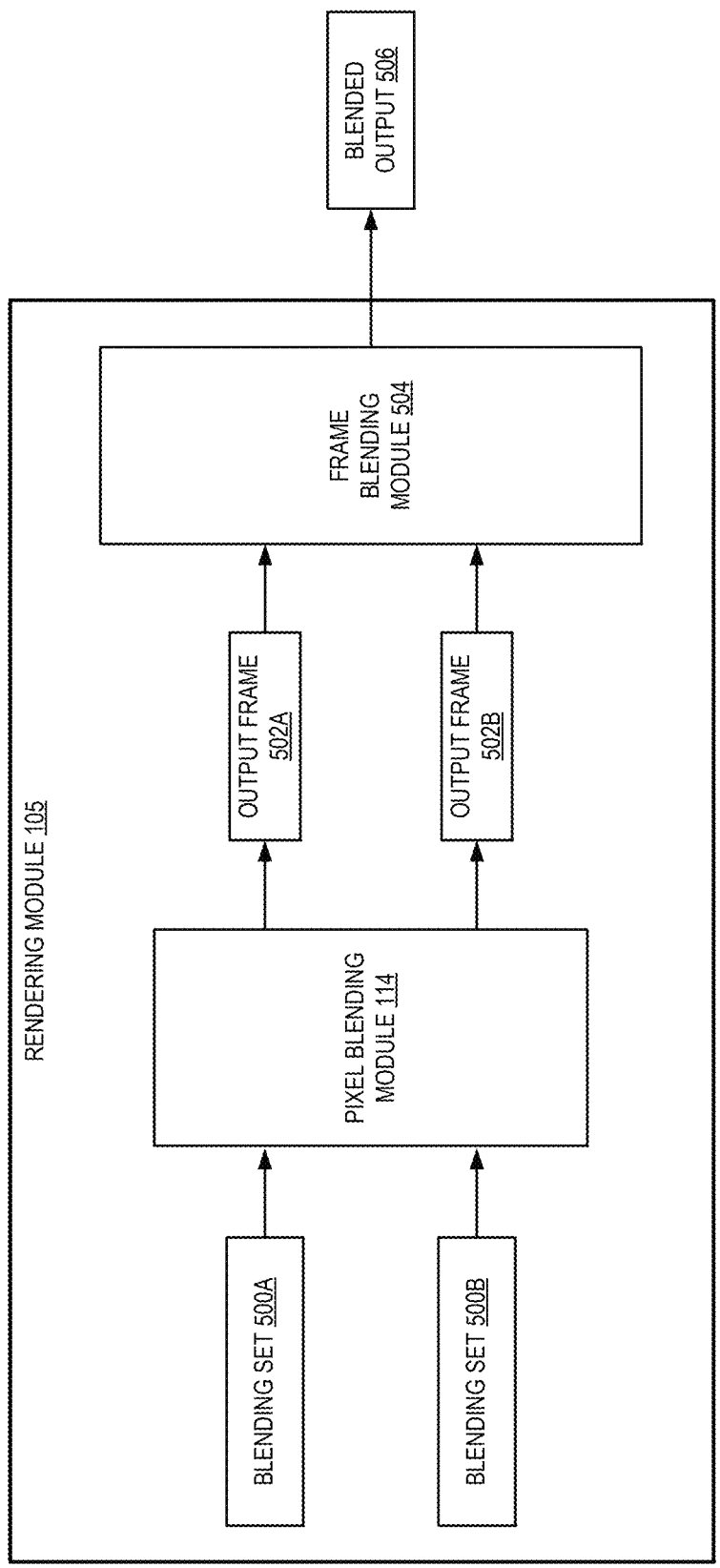
FIG. 5 illustrates a diagram of a process of generating a blended output from a plurality of output frames generated using hybrid stochastic layered alpha blending in accordance with one or more embodiments.

FIG. 5 illustrates a diagram of a process of generating a blended output from a plurality of output frames generated using hybrid stochastic layered alpha blending in accordance with one or more embodiments. In one or more embodiments, to achieve a final, higher-quality rendering, the rendering module 105 can optionally blend multiple output frames by repeating the process described with respect to FIGS. 1-4 with different blending sets generated from a rendering input. This form of temporal anti-aliasing can produce a final output of high-quality, while using additional time and resources versus the single-pass, relatively low-noise composited output generated as described with respect to FIG. 1.

In one or more embodiments, to generate the multiple blending sets, the operations described in numerals 4-6 of FIG. 1 are repeated multiple times (e.g., once for each blending set). For example, in a first iteration, to generate blending set 500A, a rasterizer (e.g., rasterizer 106 in FIG. 1) generates fragments from a rendering input (e.g., a 3D model, meshes, textures, etc.) that are inserted into a fragment buffer using the hybrid stochastic layered alpha blending (SLAB) technique described previously. Blending set 500A can then be provided to the pixel blending module 114, which blend the fragments in the blending set for each pixel to generate an output frame 502A. Output frame 502A can then be sent to a frame blending module 504. As output frame 502A is the first output frame received by the frame blending module 504, output frame 502A can be stored in a buffer or memory location. In a second iteration, the process described above can be repeated, beginning with the rasterizer generating a new set of fragments from the rendering input to the generating of blending set 500B. Blending set 500B can then be provided to the pixel blending module 114, which blends the fragments in the blending set for each pixel to generate an output frame 502B. Output frame 502B can then be sent to a frame blending module 504. The blending module 504 can retrieve the stored output frame 502A and blend output frame 502A and output frame 502B. The resulting blended frame can then be stored and accessible for retrieval and blending in additional iterations of the process. In one or more embodiments, the process described in FIG. 1 can be repeated until a desired quality level is reached or a defined number of iterations. In one or more embodiments, the quality level can be user-defined (e.g., user selection of a quality value, etc.). After completing the number of iterations, the final blending can result in blended output 506, which can be provided similarly to output 120 described in FIG. 1.

In an alterative embodiment, a plurality of output frames (e.g., output frame 502A, output frame 502B, etc.) are sent to a frame blending module 504 in parallel, instead of serially. In such embodiments, the pixel blending module 114 stores each output frame after they are generated. When the desired number of iterations of the process have been completed (and after generating a plurality of output frames), the plurality of output frames can be retrieved from storage and sent to the frame blending module 504 for blending.

Figure 6:
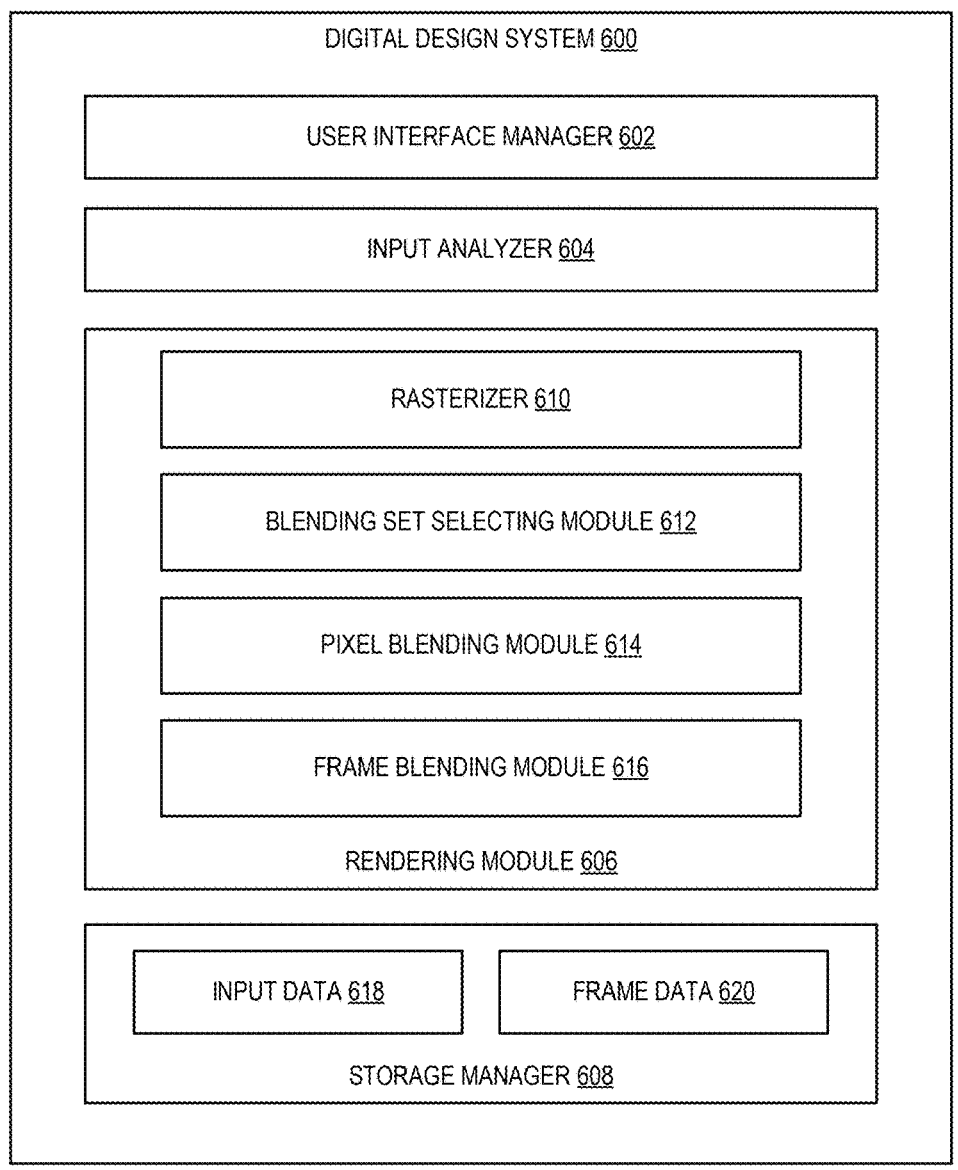
FIG. 6 illustrates a schematic diagram of a digital design system in accordance with one or more embodiments.

FIG. 6 illustrates a schematic diagram of a digital design system (e.g., "digital design system" described above) in accordance with one or more embodiments. As shown, the digital design system 600 may include, but is not limited to, a user interface manager 602, an input analyzer 604, a rendering module 606, and a storage manager 608. The rendering module 606 can include a rasterizer 610, a blending set selecting module 612, a pixel blending module 614, and a frame blending module 616. The storage manager 608 includes input data 618 and frame data 620.

As illustrated in FIG. 6, the digital design system 600 includes the user interface manager 602. For example, the user interface manager 602 allows users to provide inputs to the digital design system 600, including a rendering input (e.g., a 3D model, meshes, textures, etc.). In some embodiments, the user interface manager 602 provides a user interface through which the user can submit the rendering input. Alternatively, or additionally, the user interface may enable the user to download the rendering input from a local or remote storage location (e.g., by providing an address (e.g., a URL or other endpoint) associated with a data source). Additionally, the user interface manager 602 allows users to request the digital design system 600 to perform a rendering operation (e.g., a rendering of a digital representation using the rendering input) by enabling the user to provide parameters defining the rendering operation. In some embodiments, the user interface manager 602 enables the user to view the resulting output render.

As further illustrated in FIG. 6, the digital design system 600 also includes the input analyzer 604. The input analyzer 604 analyzes an input received by the digital design system 600 to identify the rendering input to be used for generating composited outputs using the rendering module 606.

As further illustrated in FIG. 6, the digital design system 600 also includes the rendering module P06. The rendering module 606 is configured to generate a rendered output using input data. In one or more embodiments, the rendering module 606 includes a rasterizer 610 configured to generate fragment data from the rendering input. For example, the rasterizer 610 generates the fragment data (e.g., depth data, opacity data, color data, etc.) for pixels by processing the rendering input.

In one or more embodiments, the rendering module 606 includes a blending set selecting module 612 configured to determine a plurality of fragments to be used as a blending set to generate a composited output for each pixel. The size of the blending set (e.g., the number of fragments in the blending set) can be up to the size of fragment buffer (e.g., a fragment buffer limit per pixel). When the number of fragments is less than the size of the fragment buffer, the blending set selecting module 612 can select all of the fragments in the fragment buffer as the blending set. When the number of fragments is greater than the size of the fragment buffer, the blending set selecting module 612 can select the number of fragments up to the size of the fragment buffer as the blending set, where the excess fragments to be included are determined using stochastic layered alpha blending (SLAB). For example, blending set selecting module 612 modifies the fragments in the fragment buffer by swapping out fragments in the fragment buffer with newly received fragments. The blending set selecting module 612 repeats this process until all fragments received by the rendering module 606 are processed.

The rendering module 606 includes a pixel blending module 614 configured to use the fragment data for fragments in the blending set to generate a composited output. In one or more embodiments, the pixel blending module 614 determines the composited output by utilizing depth data, opacity data, and color data for each layer to obtain a single composited output (e.g., a pixel color) for each pixel in a digital representation (e.g., an animated sequence).

In one or more embodiments, the process performed by the blending set selecting module 612 and the pixel blending module 614 can optionally be repeated to generate additional composited outputs using different blending sets of the same input data. In such embodiments, a frame blending module 616 is configured to merge the plurality of composited outputs to generate a final output that converges out remaining SLAB noise.

As illustrated in FIG. 6, the digital design system 600 also includes the storage manager 608. The storage manager 608 maintains data for the digital design system 600. The storage manager 608 can maintain data of any type, size, or kind as necessary to perform the functions of the digital design system 600. The storage manager 608, as shown in FIG. 6, includes input data 618 and frame data 620. The input data 618 can include rendering data used for rendering digital representations received as inputs to the digital design system 600. The rendering data can include models, meshes, textures, geometry data, etc. In some embodiments, where the hybrid SLAB process is optionally performed iteratively with different blending sets from a same rendering input, the frame data 620 can store blended frames data generated by the frame blending module 616 that can be retrieved to perform additional blends with additional output frames generated by the pixel blending module 614.

Each of the components 602-608 of the digital design system 600 and their corresponding elements (as shown in FIG. 6) may be in communication with one another using any suitable communication technologies. It will be recognized that although components 602-608 and their corresponding elements are shown to be separate in FIG. 6, any of components 602-608 and their corresponding elements may be combined into fewer components, such as into a single facility or module, divided into more components, or configured into different components as may serve a particular embodiment.

The components 602-608 and their corresponding elements can comprise software, hardware, or both. For example, the components 602-608 and their corresponding elements can comprise one or more instructions stored on a computer-readable storage medium and executable by processors of one or more computing devices. When executed by the one or more processors, the computer-executable instructions of the digital design system 600 can cause a client device and/or a server device to perform the methods described herein. Alternatively, the components 602-608 and their corresponding elements can comprise hardware, such as a special purpose processing device to perform a certain function or group of functions. Additionally, the components 602-608 and their corresponding elements can comprise a combination of computer-executable instructions and hardware.

Furthermore, the components 602-608 of the digital design system 600 may, for example, be implemented as one or more stand-alone applications, as one or more modules of an application, as one or more plug-ins, as one or more library functions or functions that may be called by other applications, and/or as a cloud-computing model. Thus, the components 602-608 of the digital design system 600 may be implemented as a stand-alone application, such as a desktop or mobile application. Furthermore, the components 602-608 of the digital design system 600 may be implemented as one or more web-based applications hosted on a remote server. Alternatively, or additionally, the components of the digital design system 600 may be implemented in a suite of mobile device applications or "apps."

As shown, the digital design system 600 can be implemented as a single system. In other embodiments, the digital design system 600 can be implemented in whole, or in part, across multiple systems. For example, one or more functions of the digital design system 600 can be performed by one or more servers, and one or more functions of the digital design system 600 can be performed by one or more client devices. The one or more servers and/or one or more client devices may generate, store, receive, and transmit any type of data used by the digital design system 600, as described herein.

In one implementation, the one or more client devices can include or implement at least a portion of the digital design system 600. In other implementations, the one or more servers can include or implement at least a portion of the digital design system 600. For instance, the digital design system 600 can include an application running on the one or more servers or a portion of the digital design system 600 can be downloaded from the one or more servers. Additionally, or alternatively, the digital design system 600 can include a web hosting application that allows the client device(s) to interact with content hosted at the one or more server(s).

For example, upon a client device accessing a webpage or other web application hosted at the one or more servers, in one or more embodiments, the one or more servers can provide a user of the client device with an interface to provide inputs, including fragments for rendering. Upon receiving the inputs, the one or more servers can automatically perform the methods and processes described above to perform a processing operation to generate a rendering output using a hybrid stochastic layered alpha blending technique.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 8. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 8.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 8.

Figure 7:
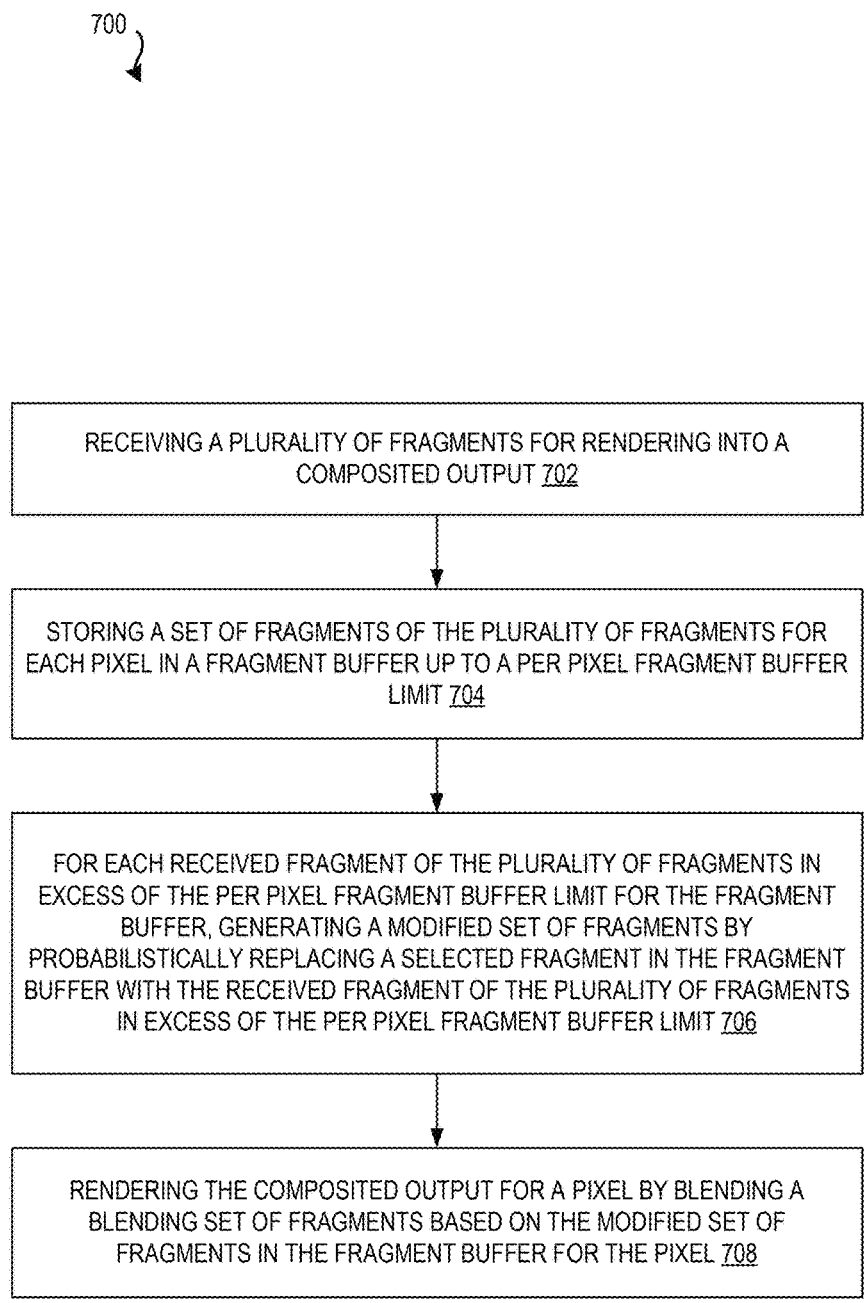
FIG. 7 illustrates a flowchart of a series of acts in a method of generating a rendering output using a hybrid stochastic layered alpha blending technique in accordance with one or more embodiments.

FIGS. 1-6, the corresponding text, and the examples, provide a number of different systems and devices to allow a digital design system to generate a rendering output using a hybrid stochastic layered alpha blending technique. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of generating a rendering output using a hybrid stochastic layered alpha blending technique in accordance with one or more embodiments. In one or more embodiments, the method 700 is performed in a digital medium environment that includes a digital design system (e.g., digital design system 600). The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving a plurality of fragments for rendering into a composited output. In one or more embodiments, a digital design system receives a rendering input from a user (e.g., via a computing device). In one or more embodiments, the user may provide the rendering input in an application, or the user may submit the rendering input to a web service or an application configured to receive inputs. The rendering input can include a 3D model data, meshes, textures, geometry, etc. The rendering input is then sent to a rendering module for processing by a rasterizer. The rasterizer processes the rendering input to generate the plurality of fragments. Each fragment is associated with data, including depth data, opacity data, color data, and fragment type data, that the rendering module uses to generate output data (e.g., color data, etc.) for an associated pixel. The plurality of fragments can then be streamed to a blending set selecting module of the rendering module to generate the composited output.

As illustrated in FIG. 7, the method 700 includes an act 704 of storing a set of fragments of the plurality of fragments for each pixel in a fragment buffer up to a per pixel fragment buffer limit. The fragments are processed by the rasterizer and stored per pixel, for all the pixels in a frame. The per pixel fragment buffer limit can be a fixed size based on memory space or a memory allocation. In one or more embodiments, as the plurality of fragments are streamed to the fragment buffer, the blending set selecting module stores or places them in the fragment buffer. In one embodiment, the fragments are stored in the fragment buffer in the order received (e.g., unsorted by depth). The fragment buffer can only hold fragments up to the per pixel fragment buffer limit.

As illustrated in FIG. 7, the method 700 includes an act 706 of, for each received fragment of the plurality of fragments in excess of the per pixel fragment buffer limit for the fragment buffer, generating a modified set of fragments by probabilistically replacing a selected fragment in the fragment buffer with the received fragment of the plurality of fragments in excess of the per pixel fragment buffer limit. When the rasterizer provides a fragment (e.g., an incoming fragment) in excess of the per pixel fragment buffer limit (e.g., the fragment buffer is full), the blending set selecting module can determine how to handle the incoming fragment. For example, the blending set selecting module can keep the incoming fragment by replacing an existing fragment in the fragment buffer with the incoming fragment, or the blending set selecting module can discard the incoming fragment.

In one or more embodiments, using the SLAB method, the blending set selecting module probabilistically determines or identifies a candidate fragment from the fragments in the fragment buffer based on transparency data and depth data associated with each fragment in the fragment buffer. For example, the candidate fragment in the fragment buffer selected for replacement can be the fragment in the fragment buffer that has a probability of being obscured by another fragment based on overlapping transparencies of the fragments in the fragment buffer. For example, the more transparent and deeper a fragment is, the less likely it will be included in the ultimate blending set, and, conversely, the less transparent and nearer a fragment is, the more likely it will be included in the ultimate blending set.

As illustrated in FIG. 7, the method 700 includes an act 708 of rendering the composited output for a pixel by blending a blending set of fragments based on the modified set of fragments in the fragment buffer for the pixel. After all the fragments have been processed by the rendering module (e.g., the stream of fragments from the rasterizer has ended) and determined whether to be place in the fragment buffer, the fragments in the fragment buffer is the blending set of fragments that will contribute to determining the output data for the corresponding pixel. In one or more embodiments, the rendering module includes a pixel blending module configured to generate the composited output using the data for the blending set of fragments in the fragment buffer. The blending performed by the pixel blending module may use K-buffer precise alpha blending or S-style quantized alpha blending depending on the fragment composition of the blending set of fragments in the fragment buffer. For example, the composited output can include an output color value generated from processing the data (e.g., depth data, opacity data, color data, fragment type data, etc.) associated with each fragment in the blending set for the pixel. The process can be repeated for each pixel. The composited output for each pixel can then be combined to generate a frame that can provided as an output.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
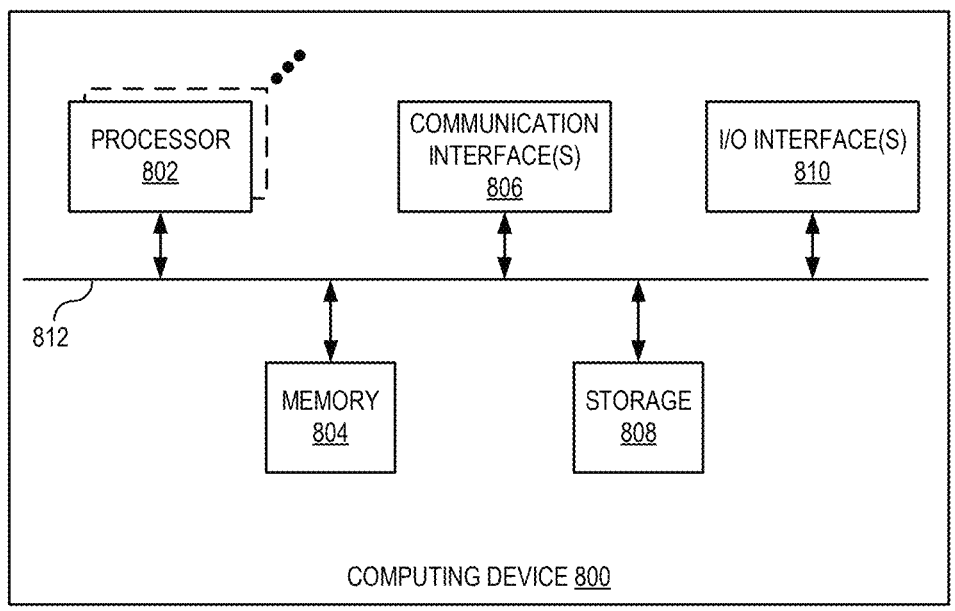
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the digital design system 600. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

I claim:

1. A method comprising:
   receiving a plurality of fragments for rendering into a composited output;
   storing a set of fragments of the plurality of fragments for each pixel in a fragment buffer up to a per pixel fragment buffer limit;
   for each received fragment of the plurality of fragments in excess of the per pixel fragment buffer limit for the fragment buffer, generating a modified set of fragments by probabilistically replacing a selected fragment in the fragment buffer with the received fragment of the plurality of fragments in excess of the per pixel fragment buffer limit; and
   rendering the composited output for the pixel by blending a blending set of fragments based on the modified set of fragments in the fragment buffer for the pixel.

2. The method of claim 1, wherein generating the modified set of fragments by probabilistically replacing the selected fragment in the fragment buffer with the received fragment of the plurality of fragments in excess of the per pixel fragment buffer limit comprises:
   analyzing fragment data for the set of fragments in the fragment buffer using stochastic layered alpha blending in an unbiased configuration;
   probabilistically determining a candidate fragment from the set of fragments in the fragment buffer based on opacity data and depth data associated with each fragment from the set of fragments; and
   identifying the determined candidate fragment from the set of fragments as the selected fragment.

3. The method of claim 2, wherein the identified candidate fragment has a probability of being obscured by another fragment based on overlapping transparencies and depths of the set of fragments in the fragment buffer.

4. The method of claim 1, wherein rendering the composited output for the pixel by blending the blending set of fragments based on the modified set of fragments in the fragment buffer for the pixel comprises:
   generating an output color value for the composited output using depth data, opacity data, color data, and fragment type data associated with each fragment in the blending set of fragments.

5. The method of claim 1, further comprising:
   marking a fragment type of the received fragment in the fragment buffer that replaced the selected fragment as being a stochastic fragment.

6. The method of claim 1, wherein the plurality of fragments are received in a fragment stream from a rasterizer for each pixel, and wherein the blending set of fragments for a pixel is the modified set of fragments in the fragment buffer when the fragment stream from the rasterizer ends for the pixel.

7. The method of claim 1, wherein the method further comprises:
generating a frame based on a plurality of composited outputs for a plurality of pixels, including the composited output, wherein each composited output in the plurality of composited outputs is for a pixel of the frame.

8. A system comprising:
a memory component; and
a processing device coupled to the memory component, the processing device to perform operations comprising:
receiving a plurality of fragments for rendering into a composited output;
storing a set of fragments of the plurality of fragments for a pixel in a fragment buffer up to a per pixel fragment buffer limit;
for each received fragment of the plurality of fragments in excess of the per pixel fragment buffer limit for the fragment buffer, generating a modified set of fragments by probabilistically replacing a selected fragment in the fragment buffer with the received fragment of the plurality of fragments in excess of the per pixel fragment buffer limit; and
rendering the composited output for a pixel by blending a blending set of fragments based on the modified set of fragments in the fragment buffer for the pixel.

9. The system of claim 8, wherein to generate the modified set of fragments by probabilistically replacing the selected fragment in the fragment buffer with the received fragment of the plurality of fragments in excess of the per pixel fragment buffer limit, the processing device further performs operations comprising:
analyzing fragment data for the set of fragments in the fragment buffer using stochastic layered alpha blending in an unbiased configuration;
probabilistically determining a candidate fragment from the set of fragments in the fragment buffer based on opacity data and depth data associated with each fragment from the set of fragments; and
identifying the determined candidate fragment from the set of fragments as the selected fragment.

10. The system of claim 9, wherein the identified candidate fragment has a probability of being obscured by another fragment based on overlapping transparencies and depths of the set of fragments in the fragment buffer.

11. The system of claim 8, wherein to render the composited output for the pixel by blending the blending set of fragments based on the modified set of fragments in the fragment buffer for the pixel, the processing device further performs operations comprising:
generating an output color value for the composited output using depth data, opacity data, color data, and fragment type data associated with each fragment in the blending set of fragments.

12. The system of claim 8, wherein the processing device further performs operations comprising:
marking a fragment type of the received fragment in the fragment buffer that replaced the selected fragment as being a stochastic fragment.

13. The system of claim 12, wherein the plurality of fragments are received in a fragment stream from a rasterizer for each pixel, and wherein the blending set of fragments is the modified set of fragments in the fragment buffer when the stream from the rasterizer ends.

14. The system of claim 8, wherein the processing device further performs operations comprising:
generating a frame based on a plurality of composited outputs for a plurality of pixels, including the composited output, wherein each composited output in the plurality of composited outputs is for a pixel of the frame.

15. A non-transitory computer-readable storage medium storing executable instructions, which when executed by a processing device, cause the processing device to perform operations comprising:
receiving a plurality of fragments for rendering into a composited output;
storing a set of fragments of the plurality of fragments for a pixel in a fragment buffer up to a per pixel fragment buffer limit;
for each received fragment of the plurality of fragments in excess of the per pixel fragment buffer limit for the fragment buffer, generating a modified set of fragments by probabilistically replacing a selected fragment in the fragment buffer with the received fragment of the plurality of fragments in excess of the per pixel fragment buffer limit; and
rendering the composited output for a pixel by blending a blending set of fragments based on the modified set of fragments in the fragment buffer for the pixel.

16. The non-transitory computer-readable storage medium of claim 15, wherein to generate the modified set of fragments by probabilistically replacing the selected fragment in the fragment buffer with the received fragment of the plurality of fragments in excess of the per pixel fragment buffer limit, the instructions further cause the processing device to perform operations comprising:
analyzing fragment data for the set of fragments in the fragment buffer using stochastic layered alpha blending in an unbiased configuration;
probabilistically determining a candidate fragment from the set of fragments in the fragment buffer based on opacity data and depth data associated with each fragment from the set of fragments; and
identifying the determined candidate fragment from the set of fragments as the selected fragment.

17. The non-transitory computer-readable storage medium of claim 16, wherein the identified candidate fragment has a probability of being obscured by another fragment based on overlapping transparencies and depths of the set of fragments in the fragment buffer.

18. The non-transitory computer-readable storage medium of claim 15, wherein to render the composited output for the pixel by blending the blending set of fragments based on the modified set of fragments in the fragment buffer for the pixel, the instructions further cause the processing device to perform operations comprising:
generating an output color value for the composited output using depth data, opacity data, color data, and fragment type data associated with each fragment in the blending set of fragments.

19. The non-transitory computer-readable storage medium of claim 15, wherein the instructions further cause the processing device to perform operations comprising:
marking a fragment type of the received fragment in the fragment buffer that replaced the selected fragment as being a stochastic fragment.

20. The non-transitory computer-readable storage medium of claim 19, wherein the plurality of fragments are received in a fragment stream from a rasterizer for each pixel, and wherein the blending set of fragments is the modified set of fragments in the fragment buffer when the stream from the rasterizer ends.

* * * * *